US012382974B2

United States Patent
Wright

(10) Patent No.: US 12,382,974 B2
(45) Date of Patent: Aug. 12, 2025

(54) SHAVED COFFEE BEANS AND COFFEE SHAVING METHODS

(71) Applicant: Eric Wright, Overland Park, KS (US)

(72) Inventor: Eric Wright, Overland Park, KS (US)

( * ) Notice: Subject to any disclaimer, the term of this patent is extended or adjusted under 35 U.S.C. 154(b) by 0 days.

(21) Appl. No.: 17/699,962

(22) Filed: Mar. 21, 2022

(65) Prior Publication Data

US 2022/0304326 A1    Sep. 29, 2022

Related U.S. Application Data

(60) Provisional application No. 63/176,476, filed on Apr. 19, 2021, provisional application No. 63/165,968, filed on Mar. 25, 2021.

(51) Int. Cl.
| | |
|---|---|
| *A23F 5/00* | (2025.01) |
| *A23F 5/08* | (2006.01) |
| *A23F 5/10* | (2006.01) |
| *A23F 5/12* | (2006.01) |

(52) U.S. Cl.
CPC . *A23F 5/08* (2013.01); *A23F 5/12* (2013.01)

(58) Field of Classification Search
CPC ..... A23F 5/08; A23F 5/12; A47J 42/00; A47J 42/10; B02C 18/00
See application file for complete search history.

(56) References Cited

U.S. PATENT DOCUMENTS

| | | | | |
|---|---|---|---|---|
| 1,219,079 | A | * | 3/1917 | Carreras ................... B02B 3/04 99/569 |
| 2,078,497 | A | * | 4/1937 | Johnston ................. A47J 42/40 220/4.21 |
| 2,599,892 | A | * | 6/1952 | Brown ...................... B02B 3/04 99/602 |

(Continued)

FOREIGN PATENT DOCUMENTS

| | | |
|---|---|---|
| CN | 2100055750 U | 2/2020 |
| WO | 2015075535 | 5/2015 |

(Continued)

OTHER PUBLICATIONS

Castro, R. & Marraccini, P. "Cytology, biochemistry and molecular changes during coffee fruit development." Brazilian Journal of Plant Physiology, vol. 18, Jan.-Mar. 2006.

(Continued)

*Primary Examiner* — Ericson M Lachica
(74) *Attorney, Agent, or Firm* — Hovey Williams LLP; Paul J. Walker

(57) ABSTRACT

A coffee bean shaving process is utilized herein to produce shaved coffee bean products, such as coffee flakes, coffee shavings, and coffee slices, which may comprise clean and smooth faces and rough edges. Due to the shaving process described herein, the shaved coffee bean products may be produced with larger and fewer surfaces, thereby yielding a coffee product with greater surface area to volume (SA/V) ratios, particularly when compared to coffee grounds produced by conventional burr grinders. Consequently, by optimizing these SA/V ratios, it has been observed that one can maximize the coffee making potential of a coffee bean and reduce the SA/V variances between particles, thereby creating more consistent results.

15 Claims, 4 Drawing Sheets

(56) References Cited

U.S. PATENT DOCUMENTS

| | | | | |
|---|---|---|---|---|
| 3,251,557 | A | * | 5/1966 | Urschel ................ B02C 18/062 241/189.1 |
| 3,615,667 | A | | 10/1971 | Joffe |
| 3,640,727 | A | * | 2/1972 | Heusinkveld ............ A23F 5/12 426/77 |
| 3,660,106 | A | | 5/1972 | McSwiggin et al. |
| 3,706,574 | A | | 12/1972 | Mahlmann et al. |
| 4,267,200 | A | | 5/1981 | Klien et al. |
| 4,605,175 | A | | 8/1986 | Weber |
| 5,064,676 | A | | 11/1991 | Gore |
| 5,076,157 | A | * | 12/1991 | Satake ..................... A23F 5/02 99/626 |
| 5,112,635 | A | * | 5/1992 | Liebermann ............ B26D 7/27 83/592 |
| 5,403,605 | A | * | 4/1995 | Smith ..................... A23F 5/26 426/433 |
| 5,676,041 | A | | 10/1997 | Glucksman et al. |
| 5,845,561 | A | * | 12/1998 | Chigira ................... A47J 31/42 99/289 R |
| 6,076,454 | A | * | 6/2000 | Hagon ..................... A23N 5/08 99/519 |
| 6,327,970 | B1 | * | 12/2001 | Kooima ............... A01D 43/081 56/2 |
| 6,336,271 | B1 | * | 1/2002 | Rider ....................... B26B 1/08 30/162 |
| 6,536,335 | B1 | | 3/2003 | Ashworth |
| 6,619,194 | B1 | * | 9/2003 | Kuan ..................... A47J 17/02 30/304 |
| 9,155,319 | B1 | * | 10/2015 | Perlman .................... A23F 5/08 |
| 2003/0005826 | A1 | * | 1/2003 | Sargent ..................... A23F 3/14 99/279 |
| 2006/0165845 | A1 | | 7/2006 | Kaku et al. |
| 2008/0038441 | A1 | * | 2/2008 | Kirschner ............. A47J 31/002 426/594 |
| 2009/0104310 | A1 | * | 4/2009 | Nakajima ................ A23F 5/02 426/595 |
| 2009/0311409 | A1 | * | 12/2009 | Luccas ..................... A23G 1/44 426/631 |
| 2010/0080886 | A1 | | 4/2010 | Hourizadeh |
| 2010/0143539 | A1 | * | 6/2010 | Minami .................... A23F 5/02 426/594 |
| 2011/0159164 | A1 | * | 6/2011 | Nakata .................... A23F 5/243 426/580 |
| 2012/0091238 | A1 | | 4/2012 | Van Os et al. |
| 2013/0025133 | A1 | * | 1/2013 | Fung ....................... A47J 17/04 30/152 |
| 2013/0202748 | A1 | * | 8/2013 | Fountain ................ A47J 31/44 426/115 |
| 2014/0060336 | A1 | | 3/2014 | Campetella et al. |
| 2014/0234488 | A1 | * | 8/2014 | Chang ..................... C12G 3/06 426/62 |
| 2014/0272592 | A1 | * | 9/2014 | Thompkins ........... H01M 4/364 252/182.1 |
| 2014/0282198 | A1 | * | 9/2014 | Mayworm .......... G06F 3/04847 382/110 |
| 2014/0370181 | A1 | * | 12/2014 | Young ..................... A23F 5/04 426/507 |
| 2015/0024105 | A1 | * | 1/2015 | Perlman ................... A23F 5/04 426/466 |
| 2015/0093690 | A1 | * | 4/2015 | Shimura ............... G03F 7/0048 430/18 |
| 2015/0122131 | A1 | * | 5/2015 | Te Velde ................ A47J 42/16 241/257.1 |
| 2015/0122924 | A1 | * | 5/2015 | Kajihara ................... B02B 5/02 241/75 |
| 2015/0202783 | A1 | * | 7/2015 | Safar ..................... B26B 21/527 30/34.05 |
| 2015/0224514 | A1 | * | 8/2015 | Mercado ................... B07B 9/02 209/159 |
| 2015/0327568 | A1 | * | 11/2015 | Penner ..................... A23F 5/32 426/507 |
| 2015/0342213 | A1 | * | 12/2015 | Dixey ..................... A23F 5/405 426/433 |
| 2015/0351430 | A1 | * | 12/2015 | Pipe ......................... A23L 29/10 426/654 |
| 2016/0015073 | A1 | * | 1/2016 | Belliveau ................ A23L 27/00 426/542 |
| 2016/0030350 | A1 | * | 2/2016 | Muller ..................... A23L 33/15 53/403 |
| 2016/0073656 | A1 | * | 3/2016 | Yitzchak ................ A23F 5/285 99/295 |
| 2016/0183978 | A1 | * | 6/2016 | Aniemena ............... A61B 17/54 132/76.5 |
| 2016/0295876 | A1 | * | 10/2016 | Smith ..................... A23F 5/405 |
| 2016/0374504 | A1 | * | 12/2016 | Hoon .................. A47J 31/4403 426/231 |
| 2017/0203552 | A1 | * | 7/2017 | D'Arcy .................... B32B 5/026 |
| 2017/0238590 | A1 | * | 8/2017 | Bansal-Mutalik ...... A23J 1/148 |
| 2018/0000108 | A1 | * | 1/2018 | Boggavarapu ...... A47J 31/5251 |
| 2018/0311406 | A1 | * | 11/2018 | Francis ................... A61L 27/06 |
| 2018/0325159 | A1 | * | 11/2018 | Karino ................... A23N 7/026 |
| 2019/0100623 | A1 | * | 4/2019 | Geng ....................... C08J 5/043 |
| 2019/0133153 | A1 | * | 5/2019 | Liu ........................... B01J 20/24 |
| 2019/0210928 | A1 | * | 7/2019 | Bottiglieri ............. C04B 35/565 |
| 2019/0390147 | A1 | * | 12/2019 | Bassoli ..................... C12G 3/024 |
| 2020/0154727 | A1 | * | 5/2020 | Celli ....................... A23F 5/10 |
| 2020/0305459 | A1 | * | 10/2020 | Bush ......................... A23F 5/10 |
| 2022/0228738 | A1 | * | 7/2022 | Ibarra ....................... B26B 3/04 |

FOREIGN PATENT DOCUMENTS

| | | | | |
|---|---|---|---|---|
| WO | WO-2018015360 | A1 | * 1/2018 | ............... A23F 5/02 |
| WO | 2021202989 | A1 | 10/2021 | |

OTHER PUBLICATIONS

Borem, F. ed. Pos-colheita do cafe. Lavras: Editora UFLA, 2008.

"My Coffee is Stealing My Coffee! A Few Notes on Absorption." May 8, 2012; https://www.blackoutcoffee.com/blogs/the-reading-room/my-coffee-is-stealing-my-coffee-a-few-notes-on-absorption; Accessed: Mar. 4, 2022.

Marcocci, Maurizio. "The Evolution of Coffee Grinders." BeanScene Magazine, Feb. 2020; https://www.beanscenemag.com.au/the-evolution-of-coffee-grinders/#:~:text=The%20first%20coffee%20grinder%2C%20dating,was%20the%20mortar%20and%20pestle.&text=In%20the%2015th%20century%2C%20people,in%20the%20late%2017th%20century; Accessed Mar. 14, 2022.

Bryman, Howard. "Minding the Grinds: Our Approach to Sampling and Judging Grind Consistency." Coffee Review; Jun. 13, 2020; https://www.coffeereview.com/minding-the-grinds-our-approach-to-sampling-and-judging-grind-consistency/; Accessed Mar. 14, 2020.

Barista Hustle; "Surface Area and Time." Jan. 30, 2017; https://www.baristahustle.com/blog/surface-area-and-time/; Accessed: Mar. 14, 2022.

Hand Ground: "An Intuitive Guide to Coffee Solubles, Extraction and TDS."; https://handground.com/grind/an-intuitive-guide-to-coffee-solubles-extraction-and-tds; Accessed: Mar. 14, 2022.

Ukers, M.A., William H.; "All About Coffee." The Tea and Coffee Trade Journal; 1922; Ch. 16; p. 5; https://ukersallaboutcoffee.wordpress.com/chapter16/; Accessed Mar. 14, 2022.

Barista Hustle; "The Most Important Thing About Brewing Coffee"; https://www.baristahustle.com/blog/the-most-important-thing-about-brewing-coffee/; Accessed: Mar. 14, 2022.

Dhari, Rahul et al., Omni Calculator; "Surface Area to vol. Ration Calculator." July, 2, 2021; https://www.omnicalculator.com/math/surface-area-volume-ratio; Accessed: Mar. 14, 2022.

Gagneastro, J., "The Dynamics of Coffee Extraction." Jan. 29, 2019; https://coffeeadastra.com/2019/01/29/the-dynamics-of-coffee-extraction/; Accessed: Mar. 14, 2022.

Mytos & Co.; "Precise particle size analysis for dry products in process environments and automated laboratories from 0.25 μm to 3,500 μm"; https://www.sympatec.com/en/particle-measurement/sensors/laser-diffraction/mytos/; Accessed: Mar. 14, 2022.

Sympatec; Helos; Rodos & Co.; https://www.tecnos.ro/brosuri/HELOS.pdf; Accessed Mar. 14, 2022.

(56) References Cited

OTHER PUBLICATIONS

International Search Report and Written Opinion dated Jun. 28, 2022 for related PCT Patent Application No. PCT/US2022/021167 which was filed on Mar. 21, 2022; 11 pages.
European Search Report dated Feb. 14, 2025 for related European Patent Application No. 22776396.8, 11 pages.
Khamitova Gulzhan et al: "Optimization of espresso coffee extraction through variation of particle sizes, perforated disk height and filter basket aimed at lowering the amount of ground coffee used", Food Chemistry, Elsevier Ltd, NL, vol. 314, Jan. 16, 2020 (Jan. 16, 2020), XP085992955, ISSN: 0308-8146, DOI: 10.1016/J.FOODCHEM. 2020.126220 [retrieved on Jan. 16, 2020].
Maille Matthew J et al: "Critical examination of particle swelling during wetting of ground coffee", Journal of Food Engineering, Elsevier, Amsterdam, NL, vol. 295, Dec. 1, 2020 (Dec. 1, 2020), XP086441604, ISSN: 0260-8774, DOI: 10.1016/J.JFOODENG. 2020.110420 [retrieved on Dec. 1, 2020].

* cited by examiner

SHAVED COFFEE BEANS AND COFFEE SHAVING METHODS

RELATED APPLICATIONS

This application claims the priority benefits under 35 U.S.C. § 119(e) of U.S. Provisional Patent Application Ser. No. 63/176,476 entitled "SHAVED COFFEE BEANS AND COFFEE SHAVING METHODS," filed Apr. 19, 2021, and U.S. Provisional Patent Application Ser. No. 63/165,968 entitled "COFFEE FLAKE, COFFEE SHAVING OR COFFEE CHIP PRODUCT," filed Mar. 25, 2021, the entire disclosures of which are incorporated herein by reference.

BACKGROUND

1. Field of the Invention

The present invention is generally related to the production of a coffee product. More particularly, the present invention is generally related to the production of a shaved coffee bean product by shaving coffee beans.

2. Description of the Related Art

The earliest accounts of a coffee grinder date back to the origins of coffee in Ethiopia when coffee was ground using a simple mortar and pestle. It was in the 15th century when, by default, people started to use their spice grinders to grind coffee, which were readily available at the time. An Englishman named Nicholas Book in the 17th century is credited with opening the very first Coffee Mill and over the last 300 years many have worked on perfecting the same basic technique used for grinding coffee, as they do for peppercorns, salts, and other spices.

Burr grinders were the conventional grinder of the past and continue to be commonly used today. However, very few advancements have occurred regarding the preparation of coffee beans for subsequent consumption. Consequently, a multitude of manual and electric machines using spinning blades and/or burr grinding technologies to grind coffee make up the conventional grinding techniques presently used.

Generally, most "grinding" processes relate to the cracking, slicing, cutting, and/or crushing of the coffee bean into ever smaller particle sizes to increase the surface area of accessible coffee pores. The size of the particle is important based on the subsequent use of the ground coffee bean. For example, espresso is ground very fine, while French Press is coarser in nature. Typically, this is due to the time differences for extraction to take place in these brewing techniques. Regardless of the grinding process (e.g., blade or Burr) or brewing style chosen (e.g., espresso, French Press, etc.), all these techniques require that the coffee bean be repeatedly contacted with a blade and/or burr teeth to create the ground needed. In other words, the coffee bean must be cracked, sliced, cut, and/or crushed multiple times during the grinding process to reach the desired diameter measurement of the coffee ground.

Furthermore, when the pores of ground coffee are exposed to a solvent, such as water, they generally release amino acids (proteins), carbohydrates, fiber, minerals, antioxidants, caffeine, and/or pectin into the solvent. This process known as "extraction" leads to the creation of the many different variations of coffee beverages over a billion people around the world enjoy every day. It is the order of dissolution of these compounds within the coffee bean cells that is important to understand. Typically, the fruit acids and caffeine dissolve the fastest and create a sour/fruity taste, while the carbohydrates (primarily sugars) dissolve a little slower and add sweetness/caramel notes to the resulting beverage. Subsequently, the remaining fibrous dry plant solids are the slowest to dissolve and add bitter/earthy notes to the mix.

A high majority of coffee is preferred to be consumed with a balanced blend of fruit and sweetness, with a touch of bitter for complexity; therefore, the process of extraction is usually stopped (removing grinds from the water) before too many of the fibrous soluble particles are dissolved. Generally, if a cup of coffee is described as "sour" or "thin," it would fall in the classification of "under-extracted." Alternatively, if the coffee beverage is described as "bitter" or "smoky," most often this trait is defined as "over-extracted." Overall, about 70% of the coffee bean is insoluble and comprised of cellulose, polysaccharides, lignin, and hemicellulose, as well as some proteins, minerals, and lipids; thereby leaving about 30% of the coffee bean as "potentially soluble."

Typically, coffee grounds today are often measured in diameter of the ground. The end goal of both burr and blade processes is to create a consistent sized range of particle sizes (diameter) to allow for a consistent extraction phase during the designated brewing process, thereby increasing the ability to replicate a desired taste.

While some of the shortcomings of conventional grinding techniques have been addressed, many are still evident. For example, the issues of the burr grinding approach primarily arise from the differing crush thresholds that exist within a roasted coffee bean and the numerous contacts the bean has with the burr teeth or spinning blade as it is reduced during the grinding process. More particularly, the outer endosperm of the coffee bean, which is more exposed to the roasting process, possesses a higher crush threshold than the inner endosperm and center cut. Due to these differences, when the different parts of the coffee bean are processed together through a burr grinder that cuts and slices by pressure via the burr teeth, the lower crush rate particles (i.e., the inner endosperm and center cut) tend to get crushed smaller than the more rigid roasted outer endosperm.

Additionally, heat generated by friction during burr grinding can also be a concern when trying to create smaller particles for espresso and Turkish brews. For many of the same reasons mentioned above, there is also a high incidence of "dust or fines" that are created during a small particle burr grinding process. There is also a high tendency for the teeth of the burrs to damage many of the outer pores of the coffee particle during the grinding process.

Most burr (e.g., flat, block, or conical) grinders grind coffee beans into a range of boulder/block-like spheres to be used in the brewing process. Blade grinders, due to the complete randomness of the multiple blade contacts, have even more variation in particle size and shape with added friction heat concerns. They also have a higher tendency to create coffee dust/fines due to the bean particle "shattering," instead of slicing, when the blade hits it at a very high rate of speed.

Moreover, one must understand the process of coffee extraction to best appreciate the deficiencies of conventional coffee grinders and ground coffee beans. Generally, water can penetrate and extract soluble particles from coffee bean cells approximately five coffee bean cell layers deep. Typically, coffee bean cells are about 20 microns in thickness; thus, it is accepted that water can only penetrate and extract soluble compounds from up to about 100 microns deep into any coffee ground (i.e., about five coffee cell layers within the surface).

FIG. 1 depicts an exemplary prior art coffee ground 10 having a 1,000-micron diameter with each block 12 representing a thickness of 100 microns. As shown in FIG. 1, a solvent, such as water, would only be able to penetrate the top layer of the coffee ground, thereby rendering most of the coffee ground unusable.

It should be noted that any penetration beyond a depth of 100 microns within a coffee ground or coffee bean may occur because of erosion of the surface of the ground caused by extended time. However, increased extraction due to erosion is generally not an accepted practice since it causes negative taste characteristics in the resulting coffee drink and has limited retail attractiveness due to increased time. Therefore, the challenge when dealing with coffee grounds and extraction is how to best maximize production from the coffee cells within 100 microns of the coffee grounds' surface without producing a coffee product with undesirable taste characteristics.

Furthermore, it has been observed that one cannot maximize extraction properties of coffee grounds by simply producing grounds with smaller diameters, so as to expose all of the coffee bean cells to extraction processes. Coffee grounds with diameters of 100 microns or less can be considered "fines" and typically form coffee beverages that exhibit a high amount of "bitter" taste profiles due to the soluble compounds within the coffee grounds dissolving faster than desired. In other words, such small diameter coffee grounds can be easily over-extracted and overpower the resulting taste profile of the coffee beverage. Moreover, the use of these smaller diameter coffee grounds can cause "channeling," which occurs when these smaller diameter grounds clump together and cause channels to form throughout grounds, thereby causing the water to only contact a limited percentage of the coffee grounds. Consequently, this is why baristas must "tamp" coffee grounds in order to remove channels and try to form a consistent bed of grounds. Lastly, such fine diameter coffee grounds tend to either clog the coffee filter or create a high amount of sediment within the coffee beverage itself.

While some of the shortcomings of conventional grinding techniques have been addressed, many are still evident. For example, the issues of burr grinding primarily arise from the differing crush thresholds that exist within a roasted coffee bean and the numerous contacts the bean has with the burr teeth or spinning blade as it is reduced during the grinding process. More specifically, the outer endosperm of the coffee bean, which is more exposed to the roasting process, possesses a higher crush threshold than the inner endosperm. More particularly, roasting causes a decrease of water within the coffee bean and a movement of oils to the exterior that create a hardened layer, or shell. Thus, conventional burr grinding techniques produce inconsistent ground sizes that can yield coffee products with unpredictable taste characteristics.

Thus, alternative and superior techniques for producing a coffee product for various brewing processes are still desired.

SUMMARY

One or more embodiments of the present disclosure generally concern a method for producing a shaved coffee bean product. Generally, the method comprises, consists essentially of, or consists of: (a) providing an initial feedstock comprising one or more coffee beans; and (b) subjecting the initial feedstock to a shaving process with a cutting element so as to produce the shaved coffee bean product comprising a plurality of shaved coffee bean particles. Furthermore, at least 50 percent of the shaved coffee bean particles comprise: (i) a minimum transverse dimension of 50 to 500 µm, (ii) a maximum transverse dimension of 50 to 10,000 µm, (iii) a transverse aspect ratio of 2:1 to 100:1, and (iv) a surface area to volume ratio ("SA/V ratio") of 3 to 50.

One or more embodiments of the present disclosure generally concern a method for producing a coffee beverage. Generally, the method comprises, consists essentially of, or consists of: (a) providing a shaved coffee bean product comprising a plurality of shaved coffee bean particles and (b) brewing at least a portion of the shaved coffee bean product to thereby form the coffee beverage. Furthermore, at least 50 percent of the shaved coffee bean particles comprise: (i) a minimum transverse dimension of 50 to 500 µm, (ii) a maximum transverse dimension of 50 to 10,000 µm, (iii) a transverse aspect ratio of 2:1 to 100:1, and (iv) a surface area to volume ratio ("SA/V ratio") of 3 to 50.

One or more embodiments of the present disclosure generally concern a shaved coffee bean product. Generally, the shaved coffee bean product comprises, consists essentially of, or consists of a plurality of shaved coffee bean particles. Furthermore, at least 50 percent of the shaved coffee bean particles comprise: (i) a minimum transverse dimension of 50 to 500 µm, (ii) a maximum transverse dimension of 50 to 10,000 µm, (iii) a transverse aspect ratio of 2:1 to 100:1, and (iv) a surface area to volume ratio ("SA/V ratio") of 3 to 50.

BRIEF DESCRIPTION OF THE FIGURES

Embodiments of the present invention are described herein with reference to the following drawing figures, wherein.

DETAILED DESCRIPTION

In contrast to conventional burr grinding technology, the present disclosure is directed to a unique coffee shaving process that allows the production of shaved coffee bean products, such as coffee flakes, coffee shavings, and coffee slices, which may comprise clean and smooth faces and rough edges, due to the shaving process using to produce such products. Due to the shaving process described herein, shaved coffee bean products may be produced with larger and fewer surfaces, thereby yielding a coffee product with greater surface area to volume ratios ("SA/V ratio"), particularly when compared to coffee products produced by conventional burr grinders. Consequently, by optimizing these SAN ratios, it has been observed that one can maximize the coffee making potential of a coffee bean. As would be readily appreciated by most consumers and manufacturers, the single contact shaving process described herein represents a revolutionary step forward in quality and consistency of coffee products.

Figure 2:
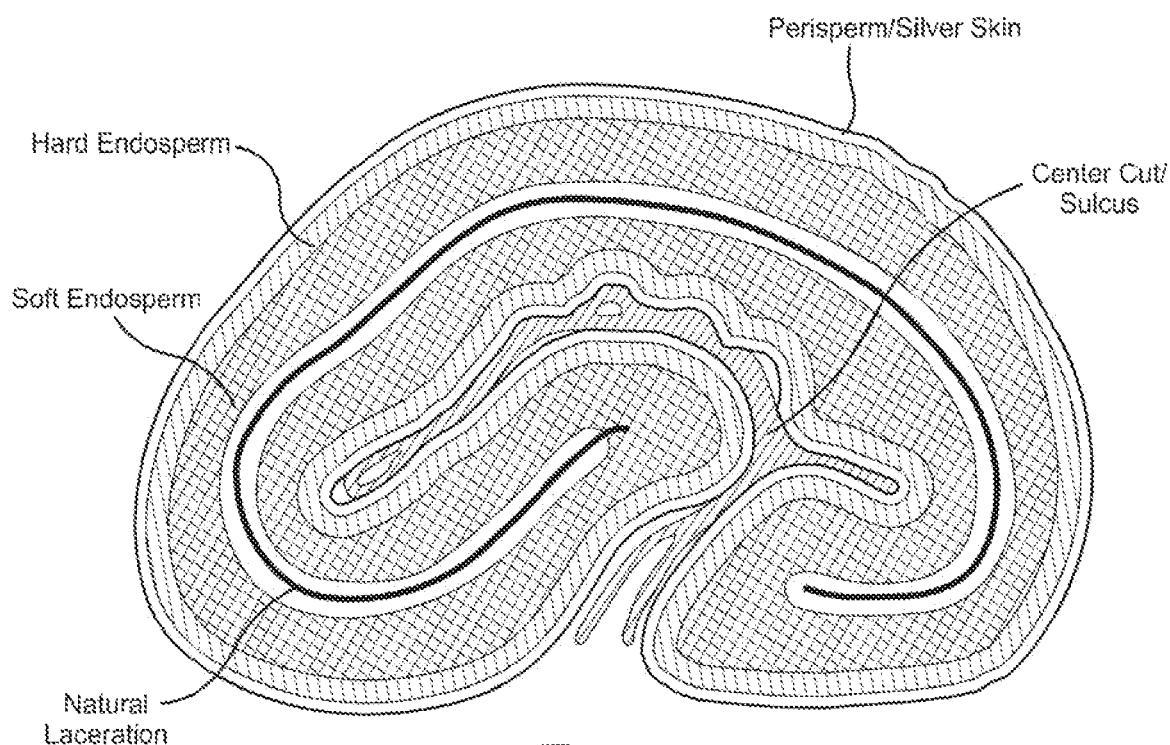
FIG. 2 depicts the sectional anatomy of a coffee bean.

The deficiencies of conventional grinding techniques can be closely correlated to the anatomy of the coffee bean itself. A coffee bean and its various segments are depicted in FIG. 2. As shown in FIG. 2, the coffee bean comprises a perisperm/silver skin, a hard endosperm, a soft endosperm, a natural laceration within the soft endosperm, and a center cut/sulcus, which may be referred to as a harder inner endosperm. These various sections within the coffee bean exhibit different chemical and cellular structures, which causes each section to exhibit different crush thresholds. Consequently, each section within the coffee bean responds differently to conventional grinding due to the difference in crush thresholds.

Figure 3:
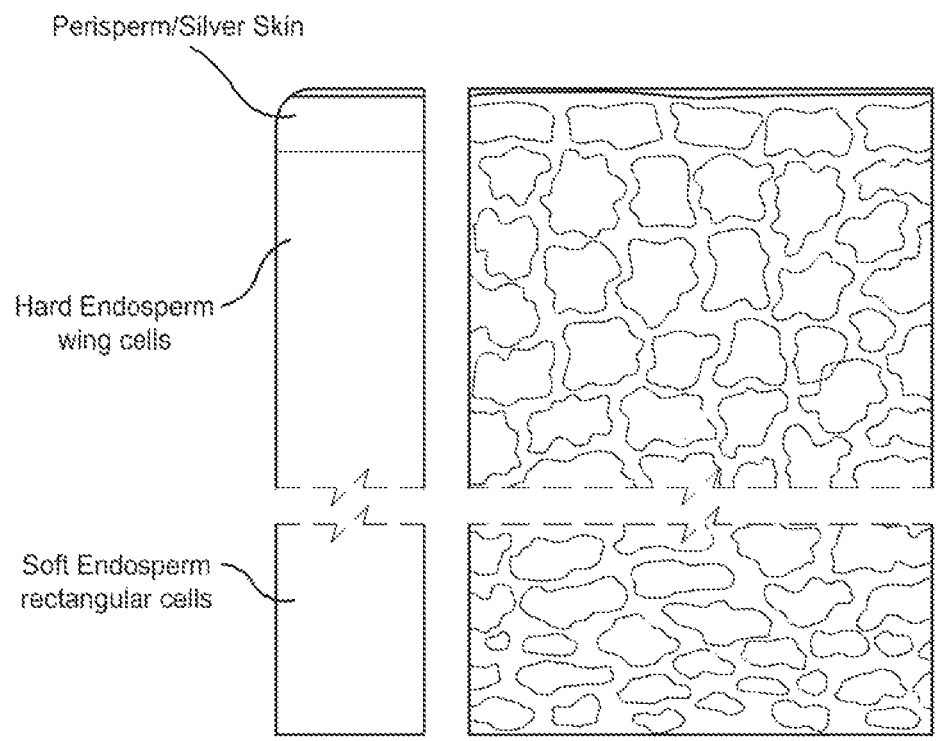
FIG. 3 is a close-up depiction and bisection of the cellular configuration within the sectional anatomy of a coffee bean.

FIG. 3 provides a more detailed depiction of the orientation of coffee bean cells within the hard endosperm and the coffee bean cells in the interior soft endosperm. As shown in FIG. 3, the exterior hard endosperm is made up of wing cells and the interior soft endosperm is made up of rectangular cells. The endosperm is the principal reserve tissue of the coffee bean. The hard exterior and soft interior portion of the endosperm vary in oil content, cell wall thickness, and structure. These characteristic differences become more evident during the roasting process as water is evaporated out of the bean and additional oils move to the outer edges of the hard endosperm often creating a hard "shell-like" surface.

There is a desire in the industry for differing SA/V ratios of the ground coffee product so as to allow for different extraction times to bring out different flavors. For example, cold brew requires a larger particle with a longer extraction time to create the desired flavor. A general characteristic of the coffee shaving process described herein is that it allows for the production of a shaved coffee product with a lower SA/V ratio variance. More particularly, the shaving process described herein may reduce the SA/V ratio variance between the resulting coffee shavings because the cross-sections of the particles are more similar. In contrast, burr grounds, generally boulder/block-like spheres, have much higher SA/V ratio variance, as volumes between particles differ due to the above-referenced issues associated with burr grinders. Consequently, having less variation in the SA/V ratio increases the ability to replicate desirable traits of a final coffee product. Furthermore, the enhanced SA/V ratios of the shaved coffee products described herein allows for an increase in production per pound of coffee beans due to the maximization of pore and cellular access within the shaved coffee product.

Traditionally, extraction rate goals are between 18 to 22 percent of the potential soluble particles from the coffee cells using conventional grinding and extraction methods. In contrast, the shape of the shaved coffee products described herein maximizes the SA/V ratio of the coffee bean, without the high incidence of dust creation and/or unwanted heat exposure that typically occurs in conventional grinding methods. Consequently, the consistency of cross-sectional shape, regardless of depth, provides more consistency from batch to batch for all types of brewing techniques including, but not limited to, pour over, drip, espresso, French Press, cold brew, Pods, or Turkish.

Accordingly, the shaved coffee bean particles of the present disclosure manage to address the aforementioned extraction issues due to their higher SA/V ratio and unique physical structure. More particularly, due to the shaving process, the shaved coffee bean particles of the present disclosure can comprise similar structures and diameters, which can result in shaved coffee bean particles exhibiting desirable characteristics for coffee extraction. Furthermore, the shaved coffee bean particles of the present disclosure may mitigate channeling due to the flat and curve shape of the shaved particles.

Figure 1:
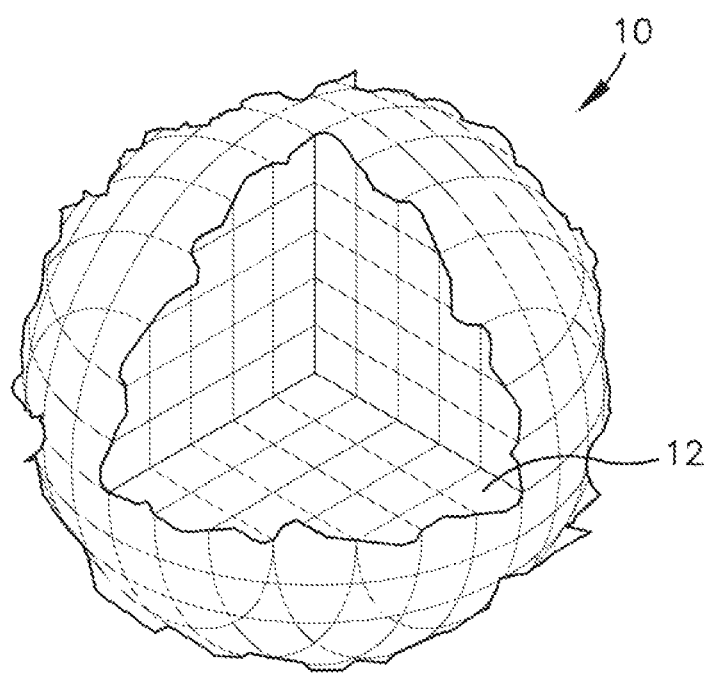
FIG. 1 depicts an exemplary prior art coffee ground particle produced by a burr grinder.
Figure 4:
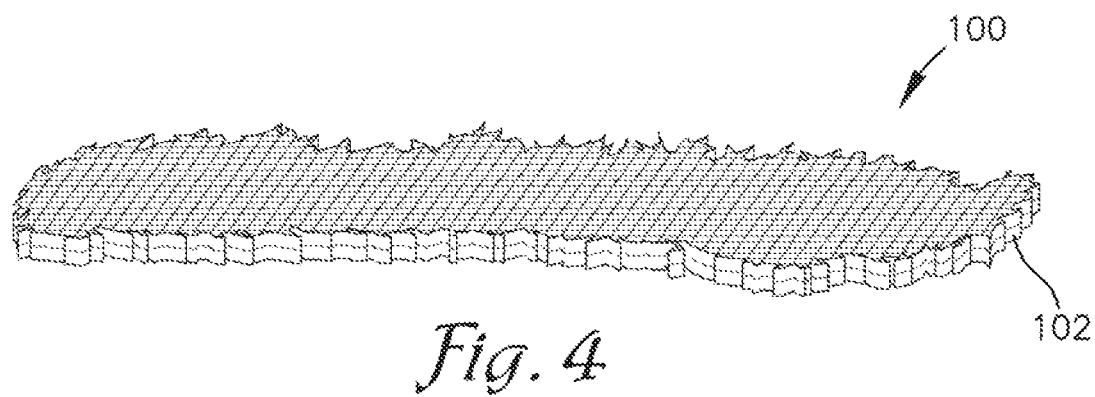
FIG. 4 is an exemplary depiction of a shaved coffee bean particle according to one or more embodiments.

An exemplary shaved coffee bean particle 100 of the present disclosure is depicted in FIG. 4, where each of the cubes 102 represents a thickness of 100 microns. As shown in FIG. 4, the coffee bean cells in the shaved coffee bean particle 100 are fully exposed to extraction due to the smaller minimal transverse dimension (i.e., thickness) of shaved particle. However, due to the larger maximum transverse dimension (i.e., length) of the shaved coffee bean particle 100, the shaved coffee bean particle may also avoid the issues associated with smaller diameter coffee grounds (e.g., channeling). The shaved geometry of the shaved coffee bean depicted in FIG. 4 may be advantageous over ground coffee beans produced by conventional grinders because the shaved coffee bean may maintain the same volume and utilize flat surfaces for a higher SA/V ratio. In contrast to ground coffee produced by conventional burr grinders, such as those shown in FIG. 1, the shaved coffee bean product generally possesses longer and flatter surfaces, as shown in FIG. 4.

Generally, the shaved products described herein may be produced by subjecting an initial foodstuff feedstock to a shaving process with a cutting element in a shaving apparatus. While the present disclosure predominantly focuses on the initial foodstuff feedstock comprising coffee beans, it is envisioned that other shaveable foodstuffs may also be present in the initial feedstock. For instance, the initial feedstock may comprise, consist essentially of, or consist of one or more nuts (e.g., cashews, walnuts, pecans, almonds, Brazilian nuts, pine nuts), one or more legumes (e.g., peanuts), dried fruits (e.g., mangoes, blueberries, bananas, plantains, apples, cherries, raspberries, raisins), or combinations thereof.

In one or more embodiments, the initial feedstock subjected to shaving may comprise at least 10, 25, 50, 75, 80, 85, 90, 95, or 99 weight percent of coffee beans, based on the total weight of the feedstock. In certain embodiments, the initial feedstock may be formed entirely from coffee beans.

Additionally, or alternatively, in one or more embodiments, the initial feedstock subjected to shaving may comprise at least 1, 5, 10, 15, 20, or 25 and/or less than 90, 75, 60, 50, 40, or 30 weight percent of one or more non-coffee materials, based on the total weight of the initial feedstock. Exemplary non-coffee materials may include dried fruits (e.g., mangoes, blueberries, bananas, plantains, apples, cherries, raspberries, and/or raisins), nuts (e.g., cashews, walnuts, pecans, almonds, Brazilian nuts, and/or pine nuts), date seeds, chicory root, mustard seeds, watermelon seeds, pumpkin seeds, root vegetables (e.g., artichoke), Yerba Mate stems, Yerba Mate leaf, sesame seeds, or combinations thereof. These non-coffee materials may also be shaved during the shaving process and produce shaved particles exhibiting the dimensional ranges discussed below regarding the shaved coffee bean particles. Thus, any of the foregoing property ranges (e.g., the minimum transverse dimension ranges, the maximum transverse dimension ranges, the transverse aspect ratios, and the SA/V ratios) may also apply to the shaved particles formed from the non-coffee materials.

In one or more embodiments, the initial feedstock can be optionally subjected to one or more pretreatments prior to the shaving process to thereby form a pretreated feedstock. This pretreated feedstock may then be subjected to the shaving process described herein. Exemplary pretreatments can include scoring and/or soaking in a solvent (e.g., water and/or acetic acid). Generally, the pretreatment may comprise at least scoring, which involves cutting a groove into the initial feedstock (e.g., scoring a groove into the coffee beans), which can facilitate the downstream breakage of the feedstock along the scored line. The scoring may be carried out by any manual or automatic scoring tool or device used in the art. In various embodiments, the scoring can involve cutting an extended groove (e.g., a scored line) along the maximum transverse dimension of the feedstock (e.g., the maximum transverse dimension of the coffee bean) in increments separated by at least 50, 100, 150, 200, 250, 300, 400, or 500 µm and/or not more than 3,000, 2,000, or 1,000 µm. These scoring lines can then be used to form a set dimension of the feedstock during the shaving process. In certain embodiments, the scoring lines may be used to define the "width" of the resulting shaved particles forming the shaved coffee product.

Although not wishing to be bound by theory, it is believed that any process requiring fewer contacts (including a single contact) with a shaving device, including those that utilize a blade, a wire, a laser, and/or a water stream, to create a ready-to-use product should allow for a faster overall production of a useable product. Furthermore, unlike coffee grounds produced by conventional grinders, the shaved coffee beans of the present disclosure may comprise more consistent sizing because the shaving process does not allow the sections within the coffee bean with a lower crush threshold to come in contact with the sections that comprise a higher crush threshold.

In one or more embodiments, the shaved coffee bean product may be produced by subjecting one or more initial coffee beans to a shaving process with a cutting element in a shaving apparatus. Generally, in one or more embodiments, the process for producing the shaved coffee bean product may comprise pushing an initial coffee bean toward a cutting element, wherein the result is a single contact particle ready for brewing and a partial coffee bean ready to be pushed toward the cutting element again to repeat the process until the entire bean or maximal useable amount has been processed into multiple single contact coffee particles ready for brewing. Alternatively, in various embodiments, the shaved coffee bean product may also be produced by moving a cutting element or shaving apparatus towards the bean.

In one or more embodiments, the cutting element may comprise a blade, a slicer, a burr, a shaver, a laser, a wire, or a combination thereof. Furthermore, in one or more embodiments, the cutting element may be made of stainless steel, a ceramic (e.g., a cemented oxide, such as aluminum oxide), carbon steel, hardened (Red) steel, diamond, tungsten, vanadium, chromium, titanium, or a combination thereof. In certain embodiments, the cutting element may be made of tungsten, molybdenum, vanadium, chromium, or any other High Speed Steel elements. Additionally or alternatively, in certain embodiments, the cutting element may be made of cemented carbides prepared from mixture of titanium, tantalum, and carbon by powder metallurgy process. Additionally or alternatively, in yet other embodiments, the cutting element may be made of stellite, i.e., a non-ferrous alloy consisting of cobalt, tungsten, and chromium. In yet other embodiments, the cutting element may be made of glass, acrylics, polymethyl acrylate, polycarbonate, polyethylene, polypropylene, PET, PVC, ABS, or a combination thereof. In particular embodiments, the cutting element may be made of Cubic Boron Nitride (CBN).

In certain embodiments, the cutting element may be a laser.

Exemplary shaving apparatuses that can be used include those that are generally used exclusively for shaving ice, which can include a Hatsuyuki shaver (e.g., a Hatsuyuki Model HC-SE shaver), a Gold Medal shaver, or a Snowie shaver (e.g., a Little Snowie 2 shaver or a Snowie 3000 shaver). In certain embodiments, the shaving apparatus may comprise any manual or powered cube ice shavers or mineral processors. An exemplary manual slicer is a mandoline slicer.

In one or more embodiments, the initial coffee bean may be pushed towards the cutting element by a centrifugal force, gravity, compressed (i.e., forced) gasses (e.g., compressed air), mechanical elements, compressed liquids (e.g., water), or a combination thereof. Exemplary mechanical elements may include a conveyer, a catapult, a threaded expander, expanding material, or any other mechanical element utilizing a mechanical engineered force.

The shaving process may occur at various temperatures (e.g., room temperature) and at atmospheric pressures. For instance, the shaving process may occur at a temperature of at least −90, −80, −70, −60, −50, −40, −30, −20, −10, −5, 0, 5, 10, 15, or 20° C. and/or less than 150, 140, 130, 120, 110, 100, 90, 80, 70, 60, 50, 40, or 30° C. The temperature of the shaving process can be influenced by the condition and wetness of the coffee beans. For instance, "freeze dried" coffee beans can utilize colder temperatures, while coffee beans with higher moisture contents may require higher shaving temperatures.

The initial coffee bean may comprise, consist essentially of, or consist of a plurality of roasted or unroasted coffee beans. Furthermore, the initial coffee beans can comprise whole beans or segmented coffee beans. In certain embodiments, the shaved coffee bean product may be subjected to roasting after the shaving process. The initial coffee beans may also be dried and contain less than 12 weight percent of water. Alternatively, in certain embodiments, the initial coffee beans may be pre-soaked with at least one solvent, such as water, and contain a moisture content that is greater than 12 weight percent.

In one or more embodiments, the present disclosure is generally directed to a single contact shaved coffee bean product that may comprise, consist essentially of, or consist of shaved coffee bean particles, such as coffee flakes, coffee shavings, coffee slices, or combinations thereof. As used herein, "shaved coffee bean particles" refer to the individual particles formed during the coffee bean shaving process. Furthermore, as used herein, "single contact" means that a surface of the initial coffee bean has only been contacted by a shaving tool once and has not been subjected to multiple contacts with the shaving tool. Thus, there is no further cutting or destruction of the shaved surface regardless of multiple blades, burrs, or any other slicing process involved in the initial contact; however, a "single contact" shaving would still encompass a shaving that has been shaved on multiple surfaces, as long as these shaved surfaces were not re-shaved or recontacted with the shaving tool. In other words, the shaved coffee product may be a result of a whole or partial coffee bean having a single contact exposure to a blade, burr, or other cutting surface that consistently possesses the potential to create coffee particles with similar minimal cross-section measurements.

As used herein, a "coffee flake" refers to shaved coffee bean particles comprising a minimum transverse dimension of 10 to 500 μM. Additionally, a "coffee shaving" refers to shaved coffee bean particles comprising a minimum transverse dimension of 501 to 1,500 μM. Furthermore, a "coffee slice" refers to shaved coffee bean particles comprising a minimum transverse dimension of 1,501 to 3,000 μM.

The type of shaving apparatus, the parameters of the shaving process, and the type of initial coffee bean used can greatly influence the amount of coffee flakes, coffee shavings, and coffee slices that are produced during the shaving process. Generally, the shaving process can form particles with relatively flat faces and coarse edges.

In one or more embodiments, the shaved coffee bean product may comprise at least 1, 5, 10, 15, 20, 25, 30, 35, 40, 45, 50, 55, 60, 65, 70, 75, 80, 85, 90, 95, or 99 weight percent of coffee flakes, based on the total weight of the shaved coffee bean product. Additionally or alternatively, in one or more embodiments, the shaved coffee bean product may comprise less than 99, 95, 90, 85, 80, 75, 70, 65, 60, 55, 50, 45, 40, 35, 30, 25, 20, 15, 10, 5, or 1 weight percent of coffee flakes, based on the total weight of the shaved coffee bean product.

In one or more embodiments, the shaved coffee bean product may comprise at least 1, 5, 10, 15, 20, 25, 30, 35, 40, 45, 50, 55, 60, 65, 70, 75, 80, 85, 90, 95, or 99 weight percent of coffee shavings, based on the total weight of the shaved coffee bean product. Additionally or alternatively, in one or more embodiments, the shaved coffee bean product may comprise less than 99, 95, 90, 85, 80, 75, 70, 65, 60, 55, 50, 45, 40, 35, 30, 25, 20, 15, 10, 5, or 1 weight percent of coffee shavings, based on the total weight of the shaved coffee bean product.

In one or more embodiments, the shaved coffee bean product may comprise at least 1, 5, 10, 15, 20, 25, 30, 35, 40, 45, 50, 55, 60, 65, 70, 75, 80, 85, 90, 95, or 99 weight percent of coffee slices, based on the total weight of the shaved coffee bean product. Additionally or alternatively, in one or more embodiments, the shaved coffee bean product may comprise less than 99, 95, 90, 85, 80, 75, 70, 65, 60, 55, 50, 45, 40, 35, 30, 25, 20, 15, 10, 5, or 1 weight percent of coffee slices, based on the total weight of the shaved coffee bean product.

As noted above, the shaving process described herein may minimize the formation of undesirable coffee fines in the shaved coffee bean product. As used herein, "coffee fines" refers to coffee bean particles comprising a minimum transverse dimension of less than 10 μM. In one or more embodiments, the shaved coffee bean product may comprise less than 25, 20, 15, 10, 5, 4, 3, 2, or 1 weight percent of coffee fines, based on the total weight of the shaved coffee bean product.

Figure 5:
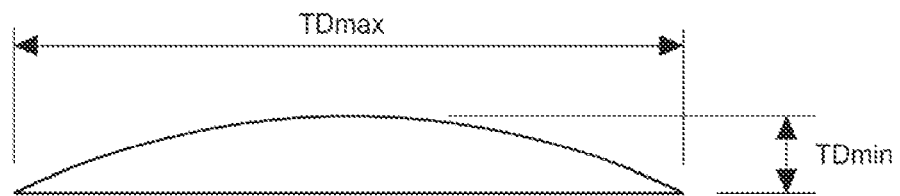
FIG. 5 is a depiction on how the minimum transverse dimension and maximum transverse dimension may be measured.

FIG. 5 depicts the minimum transverse dimension ("TDmin") and the maximum transverse dimension ("TDmax") of an exemplary shaved coffee bean product. As used herein, "maximum transverse dimension" is the maximum dimension of a shaved coffee bean particle as measured by a Mitutoyo calibrated micrometer or by using laser diffraction particle size analysis. The term "maximum transverse dimension" may also be used interchangeably with the term "length." Furthermore, as used herein, "minimum transverse dimension" denotes the minimum transverse dimension of a shaved coffee bean particle as measured by a Mitutoyo calibrated micrometer or by using laser diffraction particle size analysis. The term "minimum transverse dimension" may also be used interchangeably with the term "thickness."

In one or more embodiments, at least 1, 5, 10, 20, 30, 40, 50, 60, 70, 80, 90, 95, or 99 percent of the shaved coffee bean particles forming the shaved coffee bean product can comprise a minimum transverse dimension of at least 1, 2, 5, 10, 15, 25, 25, 30, 35, 40, 45, 50, 60, 70, 80, 90, 100, 125, 150, 175, 200, 225, 250, 275, 300, 325, 350, 375, 400, 425, 450, 475, 500, 501, 525, 550, 575, 600, 625, 650, 675, 700, 725, 750, 775, 800, 825, 850, 875, 900, 925, 950, 975, 1,000, 1,100, 1,200, 1,300, 1,400, 1,500, or 1,501 μm. Additionally or alternatively, in one or more embodiments, at least 1, 5, 10, 20, 30, 40, 50, 60, 70, 80, 90, 95, or 99 percent of the shaved coffee bean particles forming the shaved coffee bean product can comprise a minimum transverse dimension of not more than 3,000, 2,800, 2,600, 2,400, 2,200, 2,000, 1,800, 1,600, 1,501, 1,500, 1,250, 1,000, 750, 501, 500, 450, 400, 350, 300, 250, or 200 μm.

In one or more embodiments, at least 1, 5, 10, 20, 30, 40, 50, 60, 70, 80, 90, 95, or 99 percent of the shaved coffee bean particles forming the shaved coffee bean product can comprise a maximum transverse dimension of at least 50, 100, 150, 200, 250, 300, 400, 500, 600, 700, 800, 900, 1,000, 1,250, 1,500, 1,750, 2,000, 3,000, 4,000, 5,000, 6,000, or 7,000 μm. Additionally or alternatively, in one or more embodiments, at least 1, 5, 10, 20, 30, 40, 50, 60, 70, 80, 90, 95, or 99 percent of the shaved coffee bean particles forming the shaved coffee bean product can comprise a maximum transverse dimension of not more than 20,000, 15,000, 10,000, 9,000, 8,000, 7,000, 6,000, 5,000, 4,000, 3,000, 2,000, or 1,000 μm.

In one or more embodiments, at least 1, 5, 10, 20, 30, 40, 50, 60, 70, 80, 90, 95, or 99 percent of the shaved coffee bean particles forming the shaved coffee bean product can comprise a width of at least 50, 100, 150, 200, 250, 300, 400, 500, 600, 700, 800, 900, 1,000, 1,250, 1,500, 1,750, 2,000, 3,000, 4,000, 5,000, 6,000, or 7,000 μm. Additionally or alternatively, in one or more embodiments, at least 1, 5, 10, 20, 30, 40, 50, 60, 70, 80, 90, 95, or 99 percent of the shaved coffee bean particles forming the shaved coffee bean product can comprise a width of not more than 20,000, 15,000, 10,000, 9,000, 8,000, 7,000, 6,000, 5,000, 4,000, 3,000, 2,000, or 1,000 μm. As used herein, the "width" refers to the third measured dimension of the shaved coffee bean particles and can be measured by a Mitutoyo calibrated micrometer or by using laser diffraction particle size analysis. Generally, the "width" refers to the transverse dimension that is greater than the minimum transverse dimension (e.g., the thickness) and less than the maximum transverse dimension (e.g., the length).

In one or more embodiments, at least 5, 10, 20, 30, 40, 50, 60, 70, 80, 90, 95, or 99 percent of the shaved coffee bean particles forming the shaved coffee bean product can exhibit a transverse aspect ratio of at least 2:1, 4:1, 6:1, 8:1, 10:1, 12:1, 14:1, 16:1, 18:1, or 20:1 and/or not more than 1,000:1, 500:1, 400:1, 300:1, 200:1, 100:1, 75:1, 50:1, 40:1, 30:1, 20:1, or 10:1. As used herein, "transverse aspect ratio" denotes the ratio of a shaved coffee bean particle's maximum transverse dimension to the particle's minimum transverse dimension.

As discussed above, the shaved coffee bean product, including the coffee flakes, coffee shavings, and coffee slices, may possess a minimum of one surface that is easily identifiable and can be described as flat, concave, convex, or a combination thereof. Although not wishing to be bound by theory, it is believed that the shaving process allows for the production of shaved coffee products with an optimized geometry that allows maximized access to the coffee cells during the brewing/extraction phase. In one or more embodiments, the shaved coffee bean product, including the coffee flakes, coffee shavings, and coffee slices, may comprise at least 1, 2, 3, or 4 surfaces that are planar, concave, convex, or a combination thereof.

Furthermore, as discussed above, the shaved coffee bean products, including the coffee flakes, coffee shavings, and coffee slices, may comprise an optimal SA/V ratio. Moreover, the shaved coffee bean particles may exhibit less variance in SA/V ratios compared to coffee grinds of similar volume. In one or more embodiments, at least 1, 5, 10, 20, 30, 40, 50, 60, 70, 80, 90, 95, or 99 percent of the shaved coffee bean particles forming the shaved coffee bean product can comprise a BET specific surface area of at least 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, or 7.0 m$^2$/g and/or not more than 40, 30, 20, 15, or 10 m$^2$/g, as measured by using the BET method. The BET specific surface area may be measured using a cell distribution measuring device, such as a Nova 4200e Analyzer by Quantachrome Instruments.

In one or more embodiments, at least 1, 5, 10, 20, 30, 40, 50, 60, 70, 80, 90, 95, or 99 percent of the shaved coffee bean particles forming the shaved coffee bean product can comprise a SAN ratio of at least 0.5, 1, 2, 3, 4, 5, 6, 7, 8, 9, 10, 11, 12, 13, 14, 15, 16, 17, 18, or 19, or 20 mm$^{-1}$ and/or not more than 50, 40, 30, or 25 mm$^{-1}$, as measured using laser diffraction particle size analysis.

It should be noted that the above percentages regarding the shaved bean particles refer to weight percentages of the shaved coffee bean particles in reference to the total weight of the shaved coffee bean particles. For example, "at least 10 percent" of the shaved coffee bean particles means at least 10 weight percent of the shaved coffee bean particles, based on the total weight of all the shaved coffee bean particles.

Additionally, or in the alternative, in one or more embodiments, at least 1, 5, 10, 20, 30, 40, 50, 60, 70, 80, 90, 95, or 99 percent of the shaved coffee bean particles forming the shaved coffee bean product can comprise:
- a minimum transverse dimension of 1 to 500 μm, 50 to 500 μm, 75 to 500 μm, 100 to 500 μm, 150 to 500 μm, 175 to 500 μm, 10 to 450 μm, 50 to 450 μm, 75 to 450 μm, 100 to 450 μm, 150 to 450 μm, 175 to 450 μm, 50 to 300 μm, 75 to 300 μm, 100 to 300 μm, 150 to 300 μm, 175 to 300 μm, 50 to 250 μm, 75 to 250 μm, 100 to 250 μm, 150 to 250 μm, or 175 to 250 μm;
- a maximum transverse dimension of 50 to 10,000 μm, 200 to 10,000 μm, 500 to 10,000 μm, 50 to 7,000 μm, 200 to 7,000 μm, 500 to 7,000 μm, 50 to 5,000 μm, 200 to 5,000 μm, 500 to 5,000 μm, 50 to 3,000 μm, 200 to 3,000 μm, 500 to 3,000 μm, 50 to 2,000 μm, 200 to 2,000 μm, or 500 to 2,000 μm;
- a transverse aspect ratio of 2:1 to 100:1, 2:1 to 40:1, 2:1 to 20:1, 2:1 to 10:1, 4:1 to 100:1, 4:1 to 40:1, 4:1 to 20:1, or 4:1 to 10:1; and/or
- a SA/V ratio of 3 to 50, 5 to 50, 8 to 50, 10 to 50, 11 to 50, 12 to 50, 3 to 30, 5 to 30, 8 to 30, 10 to 30, 11 to 30, or 12 to 30 mm$^{-1}$.

As noted above, the shaved coffee bean products, particularly the shaved coffee bean particles (e.g., the coffee flakes, coffee shavings, and coffee slices), may exhibit optimal porosity for coffee brewing. In one or more embodiments, at least 1, 5, 10, 20, 30, 40, 50, 60, 70, 80, 90, 95, or 99 percent of the shaved coffee bean particles forming the shaved coffee bean product can comprise a total 20 to 200 Å diameter mesopore volume of at least 0.001, 0.002, 0.003, 0.004, 0.005, 0.006, 0.007, 0.008, 0.009, or 0.01 cc/g and/or not more than 0.5, 0.4, 0.3, or 0.2 cc/g, as measured by a pore distribution measuring device, such as a Nova 4200e Analyzer by Quantachrome Instruments.

In one or more embodiments, the shaved coffee bean product may comprise at least 10, 25, 50, 75, 80, 85, 90, 95, or 99 weight percent of the shaved coffee bean particles, based on the total weight of the product. In certain embodiments, the shaved coffee bean product may be formed entirely from shaved coffee bean particles.

Additionally, or alternatively, in one or more embodiments, the shaved coffee bean product may comprise at least 1, 5, 10, 15, 20, or 25 and/or less than 90, 75, 60, 50, 40, or 30 weight percent of one or more shaved particles from non-coffee materials, based on the total weight of the initial feedstock. As noted above, these shaved particles may be derived from exemplary non-coffee materials, such as dried fruits (e.g., mangoes, blueberries, bananas, plantains, apples, cherries, raspberries, and/or raisins), nuts (e.g., cashews, walnuts, pecans, almonds, Brazilian nuts, and/or pine nuts), date seeds, chicory root, mustard seeds, watermelon seeds, pumpkin seeds, root vegetables (e.g., artichoke), Yerba Mate stems, Yerba Mate leaf, sesame seeds, or combinations thereof. These shaved particles from the non-coffee materials may also be defined by any of the aforementioned property ranges associated with the shaved coffee bean particles (e.g., the minimum transverse dimension ranges, the maximum transverse dimension ranges, the transverse aspect ratios, and/or the SA/V ratios). Thus, the above ranges regarding the shaved coffee bean particles may also apply to the shaved particles from the non-coffee materials.

Consequently, the resulting shaved coffee product may be directly used in a myriad of coffee brewing processes to produce a superior coffee beverage. The brewing techniques that may be used with the shaved coffee products may include, but are not limited to, drip, pour over, French Press, espresso, cold brew, iced, Pods, or Turkish with expected variations of taste and overall characteristics.

The brewing process has many variables, and the particle volume size (e.g., surface area) has always been a major consideration. As described above, the shaving process described herein allows the production of shaved coffee bean products which exhibit the optimal geometries and volumes desired for many brewing processes. It has been observed that, due to its optimal geometrical shapes and SA/V ratio, the shaved coffee bean products allow one to maximize extraction efficiencies in most, if not all, coffee brewing techniques.

Due to the optimal geometrical shapes contained by the shaved coffee bean products shown above, which would include the coffee flakes, coffee shavings, and coffee slices, the shaved coffee bean product may permit certain efficiencies in coffee brewing processes not obtainable by conventional ground coffee. For instance, the use of the shaved coffee bean product may increase coffee production per pound of coffee bean (relative to conventional ground coffee) and may decrease the amount of water needed to create the coffee product (due to the optimal SA/V ratio). The shaved coffee bean products, due to their increased surface area, may have fewer inner cells that absorb water, but fail to release it back into the final product. This may be measured by the post-extraction weights of the spent grounds and total volume of consumable coffee produced.

Furthermore, due to their unique geometries, the shaved coffee bean products may increase flavor within the coffee beverages that are produced therefrom, particularly during a "tamped" process. Generally, particles with flatter sides possess the ability to redirect water flowing over or around the particles better than sphere-like objects. Although not wishing to be bound by theory, the increased resistance and friction created as water flows across the flatter particles results in more flavor drawn out of the coffee cells.

Additionally, due to their unique geometries, the shaved coffee bean products may allow a lower production of sediment due to the fewer fines produced during the shaving process (relative to conventional grinding techniques). Fewer fines that end up as sentiment create a higher likelihood that the last portions of the coffee beverage that are consumed by a consumer will taste superior as the presence of these fines can lead to increased bitterness in the coffee beverage (due to over-extraction of the fines during the brewing process and continual extraction in the beverage).

This invention can be further illustrated by the following examples of embodiments thereof, although it will be understood that these examples are included merely for the purposes of illustration and are not intended to limit the scope of the invention unless otherwise specifically indicated.

EXAMPLES

Comparative Example 1

In this experiment, the crush and brittleness thresholds of the different components of a roasted coffee bean were evaluated. The crush thresholds were analyzed using a VTSYIQI (VTS-100) digital force gauge and the analysis was done with Columbian Supreme Medium Dark Roast beans (Sam's Club brand). First, the beans were separated into different sections (i.e., the outer hard endosperm, the inner soft endosperm, and the inner hard endosperm/center cut) utilizing a knife and pick. The different sections of the bean (i.e., the outer hard endosperm, the inner soft endosperm, and the inner hard endosperm/center cut) were then positioned onto a sheet of paper. Utilizing the pointed attachment of the digital force gauge, pressure was applied until fracture and two readings were recorded. The first reading was the pressure that the initial fracture occurred, and the second reading was the number of particles the original particle broke into, which was an indication of brittleness. This test was completed on 20 beans.

TABLE 1, below, provides the average fracture force rate and number of particles that were formed for each coffee section.

TABLE 1

| Coffee Section | Average Force Rate at Breakage | Average Particles Formed |
| --- | --- | --- |
| Outer Hard Endosperm | 4.38 lbs | 2.7 |
| Inner Soft Endosperm | 2.75 lbs | 3.7 |
| Inner Hard Endosperm | 3.48 lbs | 2.3 |

The above breakage rates and brittleness properties demonstrate that the different segments of the coffee bean can be processed in inconsistent manners when subjected to conventional burr grinding. More particularly, when these coffee bean segments are processed together during burr grinding, the destructive grinding can more readily crush the softer inner endosperm sections with their lower breakage rates. Thus, due to these structural differences within the segments of the coffee bean, fracture rates will differ among the various layers in the coffee beans. Consequently, the inner sections of the coffee bean end up substantially smaller than the exterior when going through the grinding process.

Example 2

Figure 6:
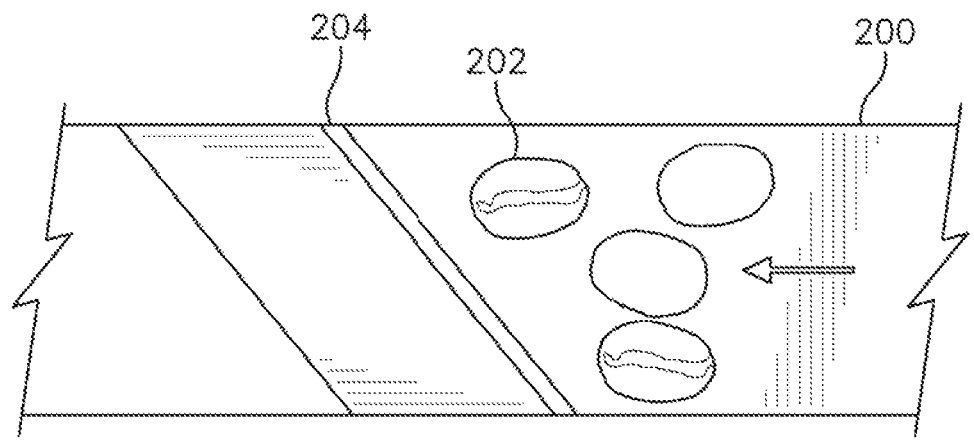
FIG. 6 depicts how the shaved bean particles were formed on a mandoline slicer for Example 2.
Figure 7:
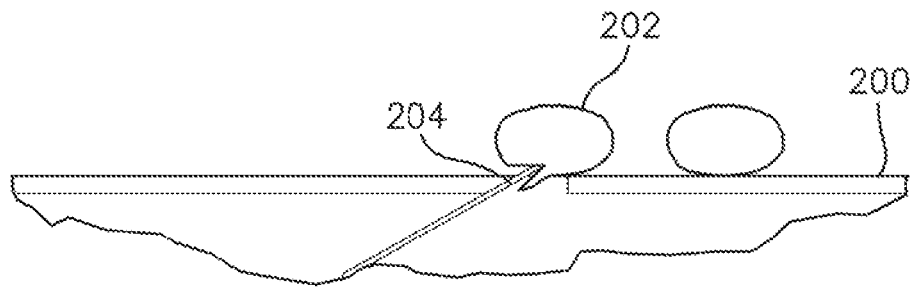
FIG. 7 depicts how the shaved bean particles were formed on a mandoline slicer for Example 2.
Figure 8:
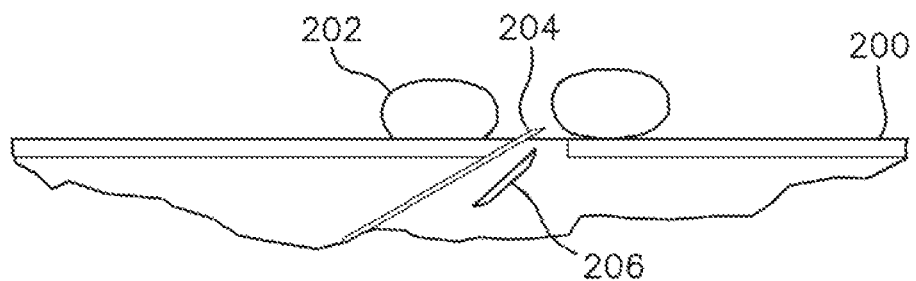
FIG. 8 depicts how the shaved bean particles were formed on a mandoline slicer for Example 2.
Figure 9:
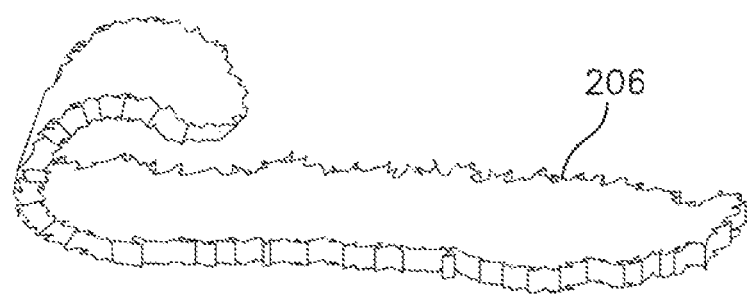
FIG. 9 depicts an exemplary shaved bean particle that was formed during Example 2.

The extraction properties of coffee grounds were compared to the inventive shaved coffee beans by forming a coffee beverage from both and testing the resulting Total Dissolved Solids (TDS) in the resulting beverages. For both tests, Columbian Supreme Medium Dark Roast beans (Sam's Club brand) were used to produce the coffee grounds and the shaved coffee beans. The ground coffee was formed with a Baratza Encore Grinder using its finest setting. Meanwhile, the shaved coffee beans were manually formed by shaving the coffee beans on a mandoline slicer, as shown in FIGS. 6-8. As shown in FIGS. 6-8, the coffee beans 202 were placed on the mandoline slicer 200 and brought into contact with the slicer blade 204 so as to form the shaved coffee bean particle 206. FIG. 9 depicts an exemplary depiction of the shaved coffee bean particles that were produced.

Coffee beverages were formed from one gram of the coffee grounds and one gram of the shaved coffee bean particles by: (i) placing the grounds and particles into an Aeropress Coffee Maker, (ii) adding two ounces of water at 195° F. to the Aeropress, (iii) allowing the coffee to brew for 30 seconds, and then (iv) actuating the Aeropress over a 10 second time period. Thus, the coffee grounds and the shaved coffee bean particles were exposed to the water for about 40 seconds. The resulting liquids that dripped through the Aeropress filter were then evaluated for Total Dissolved Solids (TDS) using an Ultrameter II by Myron L®.

The coffee beverage produced from the coffee grounds had a TDS of 666.1 ppm, while the coffee beverage produced from the shaved particles had a TDS of 734.6 ppm. Consequently, the higher TDS associated with the coffee beverage produced from the shaved coffee particles demonstrates that the unique geometries, along with the high SAN ratio, of the shaved particles exhibited superior extraction properties relative to coffee grounds that were finely ground using conventional coffee grinders. In other words, this demonstrated that the coffee bean cells in the shaved particles were more readily available for extraction compared to the coffee grounds.

Definitions

It should be understood that the following is not intended to be an exclusive list of defined terms. Other definitions may be provided in the foregoing description, such as, for example, when accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "include," and "included" have the same open-ended meaning as "comprising," "comprises," and "comprise" provided above.

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

CLAIMS NOT LIMITED TO DISCLOSED EMBODIMENTS

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A method for producing a shaved coffee product, the method comprising:
   (a) providing an initial feedstock comprising one or more coffee beans; and
   (b) subjecting the initial feedstock to a shaving process with a cutting element, wherein the shaving process comprises—
      (b-1) contacting one or more of the coffee beans with the cutting element to provide one or more single contact shaved coffee particles and one or more partial coffee beans,
      wherein the one or more single contact shaved coffee particles comprise at least one type of particle chosen from single contact coffee flakes, single contact coffee shavings, and single contact coffee slices, and wherein the one or more single contact shaved coffee particles are separated from the one or more partial coffee beans;
      (b-2) contacting at least a portion of the one or more partial coffee beans formed in step (b-1) with the cutting element again to provide one or more additional single contact shaved coffee particles and one or more additional partial coffee beans,
      wherein the one or more additional single contact shaved coffee particles comprise at least one type of particle chosen from single contact coffee flakes, single contact coffee shavings, and single contact coffee slices, and wherein the one or more additional single contact shaved coffee particles are separated from the one or more additional partial coffee beans; and
      (b-3) repeating the contacting of step (b-2) with at least a portion of the one or more additional partial coffee beans to form one or more other single contact shaved coffee particles and one or more other partial coffee beans, wherein during the repeating, one or more of the additional partial coffee beans and/or one or more of the other partial coffee beans is contacted until the entirety of the additional partial coffee bean and/or the other partial coffee bean has been formed into single contact shaved coffee particles,
      wherein the one or more other single contact shaved coffee particles comprise at least one type of particle chosen from single contact coffee flakes, single contact coffee shavings, and single contact coffee slices, and wherein the one or more other single contact shaved coffee particles are separated from the one or more other partial coffee beans; and
   (c) forming a shaved coffee product comprising at least a portion of the one or more single contact shaved coffee particles provided in step (b-1), at least a portion of the one or more additional single contact shaved coffee particles provided in step (b-2), and/or at least a portion of the one or more other single contact shaved coffee particles provided in step (b-3),
   wherein each of the one or more single contact shaved coffee particles provided in step (b-1), each of the one or more additional single contact shaved coffee particles provided in step (b-2), and each of the one or more other single contact shaved coffee particles provided in step (b-3) that form the shaved coffee product have a maximum transverse dimension and a minimum transverse dimension that is less than the maximum transverse dimension, and
   wherein at least 50 percent of the total amount of single contact shaved coffee particles that form the shaved coffee product meet each of the criteria (i) through (iv) below—
      (i) the minimum transverse dimension is from 50 to 1500 μm,
      (ii) the maximum transverse dimension is from 200 to 10,000 μm,
      (iii) a transverse aspect ratio of at least 4:1, and
      (iv) a surface area to volume ratio ("SA/V ratio") of 2 to 50 $mm^{-1}$.

2. The method according to claim 1, wherein the subjecting of step (b) occurs in a shaving apparatus.

3. The method according to claim 2, wherein the shaving apparatus comprises a manual shaver or powered shaver.

4. The method according to claim 1, wherein the minimum transverse dimension of at least 70 percent of the total amount of single contact shaved coffee particles forming the shaved coffee product is from 50 to 500 μm.

5. The method according to claim 4, wherein the maximum transverse dimension of at least 70 percent of the total amount of single contact shaved coffee particles forming the shaved coffee product is from 300 to 5,000 μm.

6. The method according to claim 5, wherein the transverse aspect ratio of at least 70 percent of the total amount of single contact shaved coffee particles forming the shaved coffee product is from 4:1 to 40:1.

7. The method according to claim 1, wherein the SA/V ratio of at least 70 percent of the total amount of single contact shaved coffee particles forming the shaved coffee product is from 5 to 40 mm$^{-1}$, as measured using a Mitutoyo Calibrated Micrometer.

8. The method according to claim 1, wherein each of the one or more coffee beans in the initial feedstock comprises an outer endosperm and an inner endosperm, wherein the outer endosperm has a higher crush threshold than the inner endosperm, wherein at least a portion of the single contact shaved coffee particles forming the shaved coffee product comprises a portion of the outer endosperm of one of the coffee beans provided in the initial feedstock.

9. The method according to claim 1, wherein the subjecting of step (b) includes moving the one or more coffee beans in the initial feedstock toward the cutting element prior to the contacting of step (b-1) and/or moving the one or more partial coffee beans formed in step (b-1) toward the cutting element prior to the contacting of step (b-2).

10. The method according to claim 1, wherein the subjecting of step (b) includes moving the cutting element toward the one or more coffee beans in the initial feedstock prior to the contacting of step (b-1) and/or moving the cutting element toward the one or more partial coffee beans formed in step (b-1) prior to the contacting of step (b-2).

11. The method according to claim 1, wherein the cutting element comprises a laser or a water stream.

12. The method according to claim 1, wherein the cutting element comprises a wire or blade.

13. The method according to claim 1, wherein the SA/V ratio of at least 90 percent of the single contact shaved coffee particles is at least 5 mm$^{-1}$ and not more than 30 mm$^{-1}$, as measured using a Mitutoyo Calibrated Micrometer.

14. The method according to claim 1, wherein at least 75 percent of the single contact shaved coffee particles have at least one flat surface and a transverse aspect ratio of at least 10:1.

15. A method for producing a shaved coffee product, the method consisting essentially of:
 (a) providing an initial feedstock comprising one or more coffee beans; and
 (b) subjecting the initial feedstock to a shaving process with a cutting element, wherein the shaving process comprises—
  (b-1) contacting one or more of the coffee beans with the cutting element to provide one or more single contact shaved coffee particles and one or more partial coffee beans,
   wherein the one or more single contact shaved coffee particles comprise at least one type of particle chosen from single contact coffee flakes, single contact coffee shavings, and single contact coffee slices, and wherein the one or more single contact shaved coffee particles are separated from the one or more partial coffee beans;
  (b-2) contacting at least a portion of the one or more partial coffee beans formed in step (b-1) with the cutting element again to provide one or more additional single contact shaved coffee particles and one or more additional partial coffee beans,
   wherein the one or more additional single contact shaved coffee particles comprise at least one type of particle chosen from single contact coffee flakes, single contact coffee shavings, and single contact coffee slices, and wherein one or more additional single contact shaved coffee particles are separated from the one or more additional partial coffee beans; and
  (b-3) repeating the contacting of step (b-2) with at least a portion of the one or more additional partial coffee beans to form one or more other single contact shaved coffee particles and one or more other partial coffee beans, wherein during the repeating, one or more of the additional partial coffee beans and/or one or more of the other partial coffee beans is contacted until the entirety of the additional partial coffee bean and/or the other partial coffee bean has been formed into single contact shaved coffee particles,
   wherein the one or more other single contact shaved coffee particles comprise at least one type of particle chosen from single contact coffee flakes, single contact coffee shavings, and single contact coffee slices, and wherein the one or more other single contact shaved coffee particles are separated from the one or more other partial coffee beans; and
 (c) forming the shaved coffee product comprising at least a portion of the one or more single contact shaved coffee particles provided in step (b-1), at least a portion of the one or more additional single contact shaved coffee particles provided in step (b-2), and/or at least a portion of the one or more other single contact shaved coffee particles provided in step (b-3),
wherein each of the one or more single contact shaved coffee particles provided in step (b-1), each of the one or more additional single contact shaved coffee particles provided in step (b-2), and each of the one or more other single contact shaved coffee particles provided in step (b-3) that form the shaved coffee product have a maximum transverse dimension and a minimum transverse dimension that is less than the maximum transverse dimension, and
wherein at least 50 percent of the total amount of single contact shaved coffee particles that form the shaved coffee product meet each of the criteria (i) through (iv) below—
 (i) the minimum transverse dimension is from 50 to 1500 μm,
 (ii) the maximum transverse dimension is from 200 to 10,000 μm,
 (iii) a transverse aspect ratio of at least 4:1, and
 (iv) a surface area to volume ratio ("SA/V ratio") of 2 to 50 mm$^{-1}$.

* * * * *